3,215,597
METHODS AND COMPOSITIONS FOR USE IN
ANIMAL HUSBANDRY
Graham T. Stevenson, Midland, Mich., assignor to The
Dow Chemical Company, Midland, Mich., a corporation of Delaware
No Drawing. Filed Oct. 30, 1963, Ser. No. 319,954
20 Claims. (Cl. 167—53)

This application is a continuation-in-part of copending application S.N. 213,858, filed August 1, 1962, now abandoned.

This invention relates to animal husbandry and more particularly to methods and compositions for the control of gastro-intestinal parasites in animals, for improving the growth of animals and for improving the efficiency of the utilization of animal feed.

Domestic animals are subject to attack by various types of gastro-intestinal parasites. Certain of the parasites commonly incurred are helminths, while others are minute protozoan organisms known as coccidia. These protozoan organisms are the causative agents of coccidiosis which is a widespread and destructive disease of chickens, ducks, pigeons, geese and turkeys. The disease is also found in pigs, dogs, lambs, calves and other domesticated animals.

The coccidia invade and multiply in various organs of their host but particularly in the gastro-intestinal tract. During the process of growth and multiplication, they erode the epithelial tissue of the cecum and intestines bringing about anemia, weakness, hemorrhage, digestive disturbances and intestinal necrosis. If the animals do not die from the infection, they are often rendered economically valueless by the disease.

It is an object of the present invention to provide a new and improved practice for raising and benefiting animals and fowl such as pigs, dogs, lambs, calves, chickens, ducks, pigeons, geese, turkeys and other domesticated animals. A further object is to provide a new and improved method for mitigating against and protecting animals from the attack of gastro-intestinal parasites. An object is the provision of a method of improving the utilization of feed by animals and for improving feed efficiency. Another object is the improvement in the nutritive value of the feed ingested and utilized by animals so as to obtain a growth-furthering effect and an improved feed utilization. Another object is to provide a novel method for the control of protozoan organisms, and for protecting animals from the attack of protozoan organisms and particularly from the attack of coccidia. A further object is the provision of a method to protect animals from the attack of the various strains of the same species of coccidial organism. Another object is to provide a novel method for benefiting and improving the growth of animals. Still another object is to provide a method which may be employed prophylactically to protect animals from the attack of gastro-intestinal parasites without adversely affecting the metabolic activity, reproduction or the blood-forming organs of animals. A further object is to provide novel feed compositions adapted to be employed in the new methods in animal husbandry. Other objects will appear throughout the following specification and appended claims.

The new method comprises administering to animals a compound corresponding to the formula:

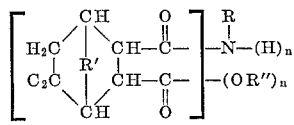

In this and succeeding formulae, R represents 3-halophenyl, 4-halophenyl or 3,5-dihalophenyl, R' represents oxygen or methylene, R" represents hydrogen or alkali metal and $n$ represents one of the numbers 0 and 1. Representative materials include the 3-(halophenylcarbamoyl and dihalophenylcarbamoyl)-2-norbornanecarboxylic acids and 3-(halophenylcarbamoyl and dihalophenylcarbamoyl) - 7 - oxabicyclo(2.2.1)heptane-2 - carboxylic acids and their alkali metal salts, and the N-(halophenyl and dihalophenyl)norbornane-2,3-dicarboximides and N-(halophenyl and dihalophenyl)-7-oxabicyclo (2.2.1)heptane-2,3-dicarboximides. The expression "alkali metal" is employed in the present specification and claims as inclusive of ammonium. Thus, the expression refers to such materials as ammonium, sodium, potassium, lithium and so forth. The expression "halo" as herein employed in the specification and claims refers to chlorine and bromine.

The practice of the present invention improves the nutritive value of animal feed so as to obtain a growth-furthering effect and improves the efficiency of the utilization of feed by animals. The practice also improves the growth made by the animals and protects the animals from parasitic diseases of the gastro-intestinal tract and particularly from coccidiosis. Further, the practice protects the animals from mixed coccidial infections and from the various strains of the same species of coccidial organism and particularly from the various strains of *Eimeria tenella* and *necatrix*. Also, while protecting the animals from coccidiosis, the practice allows the protected animals which are exposed to the coccidial infection to develop acquired immunity to the disease. The compounds are crystalline solids which are somewhat soluble in many organic solvents and are adapted to be administered to animals. They are not repellent to animals and can be employed in admixture with grain rations or animal feed. They can be administered continuously or intermittently in dosages sufficient to improve growth, to improve the feed efficiency, to improve the nutritive value and utilization of feed, or to protect the animal from the attack of gastro-intestinal parasites without adversely affecting the metabolic activity, reproduction or the blood-forming organs, or without imparting any unpalatable characteristic to animal flesh.

The oral administration or feeding of an effective dosage of the compounds is essential and critical for the practice of the present invention. In general, good results are obtained when the animals are fed a daily dosage of from 6 to 2,000 milligrams of the compounds per kilogram of body weight. Where prophylactic treatment for the control of gastro-intestinal parasites is desired and the compounds are fed continuously, daily oral dosages of from 3 to 250 milligrams per kilogram of body weight have been found to be satisfactory. Where danger of reinfestation from contaminated feed or surroundings is low, good controls are obtained when the infected animals are fed a daily dosage of 35 milligrams or more per kilogram of body weight for a period of from 2 to 5 days.

The method of the present invention can be carried out by the oral administration or feeding of the unmodified compounds. However, the present invention also embraces the employment of a liquid, powder, mash, pellet, capsule or other animal feed composition containing said compounds. In such usage, the compounds can be modified with one or more of a plurality of additaments or innocuous ingestible adjuvants including water, ethanol, propylene glycol, skim milk, edible oils, syrups, grain rations, surface active dispersing agents such as the liquid and solid emulsifying agents and edible solid carriers such as edible powders and commercial animal feeds, concentrates or supplements. By commercial animal feeds, concentrates or supplements are meant the partial and complete animal feeds containing desirable amounts of minerals, vitamins, antioxidants, antibiotics and growth stimulants. In such animal feed composition, the adjuvant cooperates with the active agent so as to facilitate the invention and obtain an improved result. Further, the compositions are adapted to be fed to animals to supply the desired dosage of active agent, or to be employed as concentrates and subsequently diluted with additional carrier or adjuvant to produce the ultimate compositions.

The exact concentration of the compounds to be employed in the compositions can vary provided that enough of the composition is ingested by the animal so as to provide the required internal dosage of active ingredient. For example, where direct administration to the individual animal is preferred, liquid or solid compositions containing from 5 to 98 percent by weight of the agents conveniently are employed to supply the desired dosage. Where the compounds are provided as a constituent of the principal food ration, satisfactory results are obtained with food rations containing a minor but effective amount of the compounds. The exact amounts of the compounds in the ration are dependent upon the food consumption and feeding habits of the animal concerned. In poultry and fowl, the required dosages can be supplied with mash compositions containing from 0.006 to 0.1 percent by weight of the active agents. In pigs, the required dosage can be supplied with mash compositions containing from 0.006 to 0.1 percent by weight of active material when fed as the principal food ration. Where the compounds are furnished in the drinking water, good results are obtained at concentrations of the agents in the water equal to one-half those employed when the compounds are supplied as a constituent in the principal food ration. In compositions to be employed as concentrates, the active agents can be present in a concentration of from 5 to 98 percent by weight. Preferred concentrate compositions oftentimes contain two or more percent by weight of a liquid or solid surface active agent. Such concentrate compositions can be administered to the animal to supply the desired dosage of active material.

Liquid compositions containing the desired amount of the compounds can be prepared by dissolving the compounds in ethanol, propylene glycol or an edible oil or by dispersing them in water with the aid of a suitable surface active dispersing agent such as an ionic or nonionic surface active agent. Suitable surface active dispersing agents include the glycerol and sorbitan esters of fatty acids and the polyoxyalkylene derivatives of fatty alcohols and of sorbitan esters. The aqueous compositions can contain one or more water-immiscible oils as a solvent for the active agent. In such compositions, the water, oil and emulsifying agent constitute an aqueous emulsion adjuvant or helper.

In the preparation of solid feed compositions, the compound can be mechanically ground with an edible solid such as cereal meal, oyster shell flour, or a solid surface active dispersing agent such as finely divided bentonite or fuller's earth. These compositions can be administered in the form of capsules or tablets or dispersed in an animal feed and such feed used to supply a part or all of the ration. Alternatively, the compounds can be dissolved in an organic solvent such as alcohol or acetone and the resulting mixture dispersed in an animal feed which is then dried to remove the solvent. The compounds can also be dispersed in an edible oil such as coconut, olive, cottonseed or peanut oil and the resulting mixtures dispersed in the feed. These edible oil compositions can contain one of the aforementioned emulsifying materials as a dispersing agent.

The following examples illustrate the invention but are not to be construed as limiting.

Example 1

25 parts by weight of N-(4'-chlorophenyl)-7-oxabicyclo(2.2.1)heptane - 2,3 - dicarboximide was dispersed in commercial poultry mash to produce feed compositions containing various amounts of the dicarboximide compound. Portions of these compositions and unmodified mash were fed as a sole feed ration to flocks of chickens of the same history and past environment which were about 17 days old. One day after the diets were begun, 50,000 sporulated *Eimeria necatrix* oocysts were introduced directly into the crop of the birds. Another flock of birds was left untreated and uninoculated to serve as an uninfected check. Seven days following the initiation of the diets, the birds were sacrificed, autopsied and an examination made to determine the percent control of coccidiosis. The percent control of coccidiosis obtained in the evaluation at the indicated precent by weight of dicarboximide compound in the diets as well as in the infected and uninfected checks are set forth in the following table.

| Agent Employed in Diet | Percent by Weight of Agent in Feed | Percent Control of Coccidiosis |
|---|---|---|
| N-(4'-Chlorophenyl)-7-oxabicyclo(2.2.1)-heptane-2,3-dicarboximide | 0.025 | 100 |
|  | 0.0125 | 96 |
|  | 0.006 | 85 |
| Infected check | 0 | (1) |
| Uninfected check | 0 | (2) |

[1] All birds heavily infected with coccidial organisms.
[2] No coccidial disease or organisms.

Example 2

In further operations, other of the compounds as aforedescribed were dispersed in commercial poultry mash to produce animal feed compositions containing varying amounts by weight of one of the compounds. Portions of these compositions were employed in the manner as described in Example 1 for the control of coccidiosis resulting from and the coccidial organisms of *Eimeria necatrix*. The compounds and concentrations at which they were employed together with the results of the evaluation are set forth in the following table.

| Test Agent | Percent by Weight of Agent in Feed | Percent Control of Coccidiosis and the Coccidial Organisms |
|---|---|---|
| N-(3',5'-Dichlorophenyl)-7-oxabicyclo(2.2.1)-heptane-2,3-dicarboximide | 0.025 | 89 |
|  | 0.0125 | 85 |
| N-(4'-Bromophenyl)-7-oxabicyclo-(2.2.1)-heptane-2,3-dicarboximide | 0.025 | 96 |
|  | 0.0125 | 81 |
| N-(3'-Chlorophenyl)-7-oxabicyclo(2.2.1)-heptane-2,3-dicarboximide | 0.025 | 85 |
| N-(4'-Bromophenyl)-norbornane-2,3-dicarboximide | 0.025 | 85 |
|  | 0.0125 | 85 |
| N-(4'-Chlorophenyl)-norbornane-2,3-dicarboximide | 0.025 | 96 |
|  | 0.0125 | 85 |
| N-(3'-Chlorophenyl)-norbornane-2,3-dicarboximide | 0.025 | 89 |
|  | 0.0125 | 85 |
| N-(3',5'-Dichlorophenyl)-norbornane-2,3-dicarboximide | 0.025 | 96 |
|  | 0.016 | 89 |
| 3-(4'-Chlorophenyl-carbamoyl)-7-oxabicyclo-(2.2.1)-heptane-2-carboxylic acid | 0.025 | 100 |
| 3-(4'-Chlorophenyl-carbamoyl)-7-oxabicyclo-(2.2.1)-heptane-2-carboxylic acid, sodium salt | 0.025 | 80 |
| 3-(4'-Chlorophenyl-carbamoyl)-2-norbornane-carboxylic acid | 0.025 | 96 |
| Infected check | 0 | (1) |
| Uninfected check | 0 | (2) |

[1] All birds heavily infected with coccidial organisms.
[2] No coccidial disease or organisms.

Example 3

Compositions containing 0.025 and 0.0125 percent by weight of N-(4'-chlorophenyl)-7-oxabicyclo(2.2.1)-heptane-2,3-dicarboximide were prepared and evaluated in the manner as described in Example 1 for the prevention of coccidiosis resulting from *Eimeria tenella*. The operations were all as previously described with the chickens being inoculated with 150,000 sporulated *Eimeria tenella* oocysts one day following the initiation of the diets. Seven days following the beginning of the evaluation, the birds were sacrificed, autopsied and an examination made to determine the percent control of coccidiosis resulting from *Eimeria tenella*. The results are set forth in the following table.

| Agent Employed in Diet | Percent by Weight of Agent in Feed | Percent Control of Coccidiosis |
|---|---|---|
| N-(4'-Chlorophenyl)-7-oxabicyclo(2.2.1)-heptane-2,3-dicarboximide | 0.025 | 100 |
|  | 0.0125 | 100 |
| Infected check | 0 | (1) |
| Uninfected check | 0 | (2) |

1 All birds heavily infected with coccidial disease.
2 No coccidial disease.

Example 4

A portion of one of the compositions as described in Example 2 containing 0.0125 percent by weight of one of the dicarboximide compounds and unmodified poultry mash were fed as a sole ration to flocks of chickens of the same history and past environment. Each flock consisted of 30 Leghorn chicks which were about 17 days old. Twenty-four hours after initiation of the diets, 150,000 sporulated *Eimeria tenella* oocysts were introduced directly into the crops of the birds. At the time of the initiation of the diets, and on the 5th, 7th, 9th and 11th days thereafter, the birds were weighed and the average weight per bird for each group determined. During the interval between the 5th and the 7th days, the coccidial infection causes maximum disturbances in the rate of growth. Another flock of birds was left untreated and uninoculated to serve as an uninfected check. The average weights per bird at the aforementioned intervals for each test group are shown in the following table.

| Dicarboximide Agent | Average Weight Per Bird in Grams on Day Indicated Ater If the Initiation of the Diet | | | | |
|---|---|---|---|---|---|
|  | 0 | 5 | 7 | 9 | 11 |
| N-(3',5'-Dichlorophenyl)-7-oxabicyclo(2.2.1)-heptane-2,3-dicarboximide | 142 | 207 | 228 | 260 | 295 |
| Infected check | 144 | 213 | 223 | 254 | 289 |
| Uninfected check | 143 | 212 | 238 | 272 | 308 |

During the evaluation, there was a seven percent mortality of chicks in the infected check group. Autopsy of the dead birds established their death as resulting from coccidial disease attributable to *Eimeria tenella*.

Example 5

A portion of the composition as described in Example 1 containing 0.025 percent by weight of N-(4'-chlorophenyl)-7-oxabicyclo(2.2.1)heptane-2,3-dicarboximide and unmodified mash were employed in the manner as described in said example. In such operations, the modified feed and unmodified feed were fed to 30 chicken flocks of Leghorns which were about 17 days old. Twenty-four hours after the initiation of the diets, 250,000 sporulated oocysts of a mixed culture containing *Eimeria acervulina*, *Eimeria maxima* and *Eimeria mivati* were introduced into the crops of the birds. At the time of the initiation o fthe diets and on the 4th, 6th, 8th and 11th days thereafter, the birds were weighed and the average weight per bird for each test group determined. Another group of birds was left untreated and uninoculated to serve as an uninfected check. The average weight per bird at the aforementioned intervals for the test groups are shown in the following table.

| Agent Employed | Average Weight Pre Bird in Grams on Day Indicated After the Initiation of the Diets | | | | |
|---|---|---|---|---|---|
|  | 0 | 4 | 6 | 8 | 11 |
| N-(4'-Chlorophenyl)-7-oxabicyclo(2.2.1)-heptane-2,3-dicarboximide | 136 | 179 | 200 | 225 | 268 |
| Infected check | 136 | 175 | 171 | 189 | 237 |
| Uninfected check | 135 | 175 | 203 | 232 | 279 |

Example 6

N-(4'-chlorophenyl)-7-oxabicyclo(2.2.1)heptane-2,3-dicarboximide was dispersed in commercial poultry mash to produce animal feed compositions containing 0.025 and 0.0125 percent by weight of the dicarboximide compound. These compositions and unmodified mash were fed as a sole feed ration to 260 bird flocks of day old chickens of the same history and environment. The groups were maintained in poultry houses and under conventional sanitary poultry practices. Just prior to the initiation of the diets, the birds were weighed and the average weight per bird for each test group determined. One month following the initiation of the evaluation, the birds are fed for a single day a ration containing a heavy infestation of sporulated oocysts of a mixed infection of *Eimeria tennela*, *Eimeria necatrix*, *Eimeria acervulina* and *Eimeria maxima*. Following the day's ration, the birds are continued on their former diets. During the evaluation, a record was kept of the feed consumed by each test group. Nine weeks after the initiation of the diets, the birds were weighed and the average weight per bird for the test groups and the feed efficiency factor determined. The feed efficiency factor is the number of grams of feed eaten per gram of body weight gained. The average terminal weights and feed efficiency factors for the test groups are set forth in the following table.

| Active Agent | Percent by Weight of Active Agent in Feed | Average Terminal Weight in Pounds | Feed Efficiency Factor |
|---|---|---|---|
| N-(4'-Chlorophenyl)-7-oxabicyclo-(2.2.1)-heptane-2,3-dicarboximide | 0.0125 | 3.51 | 2.39 |
|  | 0.025 | 3.66 | 2.36 |
| Check | 0 | 3.02 | 4.83 |

During the evalution, there was a mortality of 61 percent in the untreated check. Autopsy of the dead birds established their death to be from coccidiosis attributable to the named Eimeria organisms. In the groups of birds receiving the compound, there were no deaths during the evaluation attributable to coccidial disease,

Example 7

90 parts by weight of

N-(4'-chlorophenyl)-7-oxabicyclo(2.2.1)heptane-2,3-dicarboximide;
N-(3',5'-dibromophenyl)-7-oxabicyclo(2.2.1)heptane-2,3-dicarboximide;
N-(3',5'-dichlorophenyl)-7-oxabicyclo(2.2.1)heptane-2,3-dicarboximide;
N-(4'-chlorophenyl)-norbornane-2,3-dicarboximide;
3-(3'-bromophenylcarbamoyl)-2-norbornanecarboxylic acid;
3-(3'-bromophenylcarbamoyl)-2-norbornanecarboxylic acid, potassium salt;
N-(3',5'-dibromophenyl)-norbornane-2,3-dicarboximide;
3 - (3'-chlorophenylcarbamoyl)-7-oxabicyclo(2.2.1)heptane-2-carboxylic acid;

and 3 - (3'-chlorophenylcarbamoyl)-7-oxabicyclo(2.2.1) heptane-2-carboxylic acid, lithium salt are mechanically ground with bentonite to produce parasiticide concentrate compositions containing 90 percent by weight of one of the compounds.

In a similar manner, feed supplements are prepared by grinding together 50 parts of one of the compounds as identified in the preceding paragraph;

N - (3' - bromophenyl) - 7 - oxabicyclo(2.2.1)heptane-2,3-dicarboximide;
N-(3',5'-dichlorophenyl)-norbornane-2,3-dicarboximide;
3 - (3',5 - dichlorophenylcarbamoyl) - 2 - norbornane-carboxylic acid;
3 - (3',5' - dichlorophenylcarbamoyl) - 2 - norbornane-carboxylic acid, ammonium salt;
3 - 3',5 - dichlorophenylcarbamoyl) - 7 - oxabicyclo-(2.2.1)heptane-2-chrboxylic acid;
3 - (3',5' - dichlorophenylcarbamoyl) - 7 - oxabicyclo (2.2.1)-heptane-2-carboxylic acid, sodium salt; and
N - (3' - bromophenyl) - norbornane - 2,3 - dicarboximide with 1 part of sorbitan monopalmitate (Span 20) and 49 parts of attapulgite clay to provide compositions containing 50 percent by weight of one of the compounds.

In another operation, 20 parts by weight of a compound as identified in the foregoing two paragraphs;

3 - (4' - bromophenylcarbamoyl) - 2 - norbornanecarboxylic acid, potassium salt;
3 - (3 - chlorophenylcarbamoyl) - 2 - norbornanecarboxylic acid;
3 - (3',5' - dibromocarbamoyl) - 2 - norbornanecarboxylic acid;
3 - (4' - bromophenylcarbamoyl) - 7 - oxabicyclo(2.2.1)-heptane-2-carboxylic acid;
3 - (4' - bromohpenylcarbamoyl) - 7 - oxabicyclo(2.2.1)-heptane-2-carboxylic acid sodium salt; and
3 - 3',5' - dibromophenylcarbamoyl) - 7 - oxabicyclo-(2.2.1)heptane-2-carboxylic acid;

are each mechanically mixed with 80 parts of soybean meal to produce animal compositions containing 20 percent of one of the compounds.

In an additional operation, 10 parts by weight of a compound as identified in the foregoing three paragraphs;

3 - (3' - chlorophenyl) - norbornane - 2,3 - dicarboximide;
3-(4'-bromophenyl-norbornane-2,3-dicarboximide;
N - (3' - bromophenyl) - 7 - oxabicyclo(2.2.1)heptane-2,3-carboxylic acid;
3 - (4' - chlorophenylcarbamoyl) - 2 - norbornane-carboxylic acid;
3 - (4' - chlorophenylcarbamoyl) - 2 - norbornanecarboxylic acid, sodium salt;
3 - (4' - chlorophenylcarbamoyl) - 7 - oxabicyclo(2.2.1)-heptane-2-carboxylic acid;
3 - (4' - chlorophenylcarbamoyl) - 7 - oxabicyclo(2.2.1)-heptane-2-carboxylic acid, ammonium salt; and
N - (3,5 - dibromophenyl) - 7 - oxabicyclo(2.2.1)heptane-2,3-dicarboximide are separately dispersed in 90 parts of cottonseed oil to prepare edible oil compositions containing one of the compounds.

These compositions are adapted to be administered to animals to supply the desired dosage of active compound or to be employed as concentrates and subsequently diluted with additional edible adjuvants, grain rations or animal feeds to produce animal feed compositions containing the desired amount of active agent.

Example 8

The compounds as identified in the paragraphs of the preceding Example 7 are dispersed in commercial chicken mash to produce animal feed compositions containing 0.025 percent by weight of one of the compounds. These compositions are of outstanding nutritive value and are adapted to be fed to animals to obtain a growth-furthering effect and superior feed efficiency. The compositions are also useful in animal husbandry to control protozoan organisms and to mitigate against the attack of gastro-intestinal parasites.

In a further embodiment, the compounds as employed in accordance with the present invention, or compositions containing the same, advantageously can be employed in the present methods in combination with one or more other feed additives including agents active against gastrointestinal parasites, either as adjuvants or supplemental materials. Representative additives and agents include 2-sulfanilamidoquinoxaline, acetyl(p-nitrophenyl) sulfanilamide, sulfadimethylpyridine, sulfamethazine, sulfamerazine, sulfadimidine, 2,2'-methylene bis(4-chlorophenol), 4,4'-isopropylidene bis(o-cresol), 5-nitro-2-furaldehyde semicarbazone, furozone N-(5-nitro-2-furfurylidene-3-amino-2-oxazolidone), 3-nitro-4-hydroxyphenyl arsonic acid, p-aminobenzene arsonic acid, (1-(4-amino-2-n-propyl-5-pyrimidinylmethyl)-2- pycolinium chloride hydrochloride), the complex of 4,4'-dinitrocarbanilide and 2-hydroxy-4,6-dimethylpyrimidine, 4,5-imidazole dicarboxamide, methyl - 4 - acetamido-2-ethoxybenzoate, oxytetracycline, chlortetracyline, N-(4'-chlorophenyl) - 7 - oxabicyclo(2.2.1)heptane-2,3-dicarboximide, methyl-4-acetamido-2-ethoxybenzoate, tetraethyl thiuram disulfide, arsenosobenzene, 5-nitro-2-furaldehyde acetohydrazone, 2,2'-dihydroxy-3,3',5,5'-tetrachlorodiphenylsulfide, 4,6-diamino-2,2-dimethyl - 1,3,5-triazine hydrochloride, 2,4-diamino-5-(p-chlorophenyl)-6-ethylpyrimidines, 2,4-diamino-5-(3,4-dichlorophenyl)-6,6-diethyl-5,6-dihydro - 1,3,5-triazines, 3-5-dinitrobenzamide, 3,5-dinitro-o-toluamide, 2-chloro-4-nitrobenzamide and other analogous 2,4 - diamino-5-aryl-6-alkylpyrimidines, 2,4 - diamino-5-aryl-6,6-dialkyl-5,6-dihydro-1,3,5-triazines, dinitrobenzamides and dinitrotoluamides.

In representative operations, each of the feed additives identified in the preceding paragraph together with one of the compounds as shown in Example 7 are mechanically mixed and ground with commercial poultry mash to produce animal feed compositions. In such operations, the materials are employed in amounts sufficient to provide feed compositions containing 0.0125 percent by weight of one of the feed additives identified in the preceding paragraph and 0.0125 percent by weight of one of the compounds shown in Example 7. These compositions are of excellent value in animal husbandry and are adapted to be fed to poultry to obtain a growth-furthering effect and superior feed efficiency and to mitigate against the attack of protozoan organisms and particularly Eimeria organisms.

Also, 40 parts by weight of 3,5-dinitrotoluamide, 40 parts of N-(4'chlorophenyl)-7-oxabicyclo(2.2.1)heptane-2,3-dicarboximide and 20 parts of soybean meal are mechanically mixed together to produce an animal feed composition. Similar compositions are prepared when employing 2-chloro-4-nitrobenzamide, 3,5-dinitrobenzamide, 2,2'-methylene bis(4-chlorophenyl), (1-(4-amino-2-n-propyl-5-pyrimidinylmethyl)-2-pycolinium chloride hydrochloride) or 3-nitro-4-hydroxyphenyl arsonic acid in place of the 3,5-dinitrotoluamide component.

These compositions are adapted to be administered to animals to supply the desired amount of the compounds as employed in accordance with the present invention, or to be employed as concentrates and subsequently diluted with additional edible adjuvants, grain rations or animal feeds to produce animal feed compositions containing the desired amount of said compounds.

The N-(halophenylcarbamoyl and dihalophenyl)nor-bornane-2,3-dicarboximides and N-(halophenyl and dichlorophenyl) - 7-oxabicyclo(2.2.1)heptane-2,3-dicarbox-imides as employed in accordance with the present teachings are conveniently prepared in known methods wherein a suitable halogen substituted aniline is reacted with 2,3- norbornanedicarboxylic acid or 7-oxabicyclo(2.2.1)heptane-2-dicarboxylic acid at temperatures of from about 175° to 240° C. Treatment of these dicarboximide compounds with strong aqueous alkalies opens the nitrogen-containing rings to produce the corresponding N-(halophenylcarbamoyl and dihalophenylcarbamoyl)-2-norbornanecarboxylic acids or 3-(halophenylcarbamoyl and dihalophenylcarbamoyl) - 7 - oxabicyclo(2.2.1)heptane-2-carboxylic acids. The latter compounds are recovered as the acid or the alkali metal salt depending upon the quantity of alkali employed.

I claim:

1. In the practice of animal husbandry, the method which comprises orally administering to animals a compound having the formula:

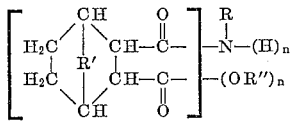

wherein R represents a member of the group consisting of 3-halophenyl, 4-halophenyl and 3,5-dihalophenyl, R' represents a member of the group consisting of oxygen and methylene, R" represents a member of the group consisting of hydrogen and alkali metal and n represents one of the numbers 0 and 1, said compound being employed daily in an amount of from 6 to 2,000 milligrams per kilogram of body weight.

2. A method which comprises feeding an animal a composition comprising as an active ingredient a compound having the formula:

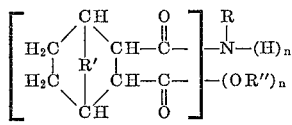

wherein R represents a member of the group consisting of 3-halophenyl, 4-halophenyl and 3,5-dihalophenyl, R' represents a member of the group consisting of oxygen and methylene, R" represents a member of the group consisting of hydrogen and alkali metal and n represents one of the numbers 0 and 1, in intimate admixture with an innocuous ingestible adjuvant, the composition being fed in an amount sufficient to provide a daily dosage of from 6 to 3,000 milligrams of said compound per kilogram of body weight.

3. A method claimed in claim 1 wherein the compound is fed daily in an amount of from 6 to 250 milligrams per kilogram of body weight.

4. A method claimed in claim 1 wherein the compound is N-(4'-chlorophenyl)-7-oxabicyclo(2.2.1) - heptane-2,3-dicarboximide.

5. A method claimed in claim 1 wherein the compound is N-(4'-bromophenyl)-7-oxabicyclo(2.2.1) - heptane-2,3-dicarboximide.

6. A method claimed in claim 1 wherein the compound is N-(3',5',-dichlorophenyl) - 7 - oxabicyclo(2.2.1) - heptane-2,3-dicarboximide.

7. A method claimed in claim 1 wherein the compound is 3-(4'-chlorophenylcarbamyl)-7-oxabicyclo(2.2.1) - heptane-2-carboxylic acid.

8. A method claimed in claim 1 wherein the compound is N-(4'-chlorophenyl)-norbornane-2,3-dicarboximide.

9. A method claimed in claim 1 wherein the compound is N - (4' - chlorophenylcarbamoyl)-2-norbornanecarboxylic acid.

10. A composition comprising from 5 to 98 percent by weight of a compound having the formula:

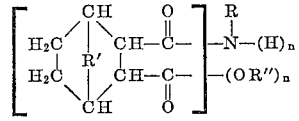

wherein R represents a member of the group consisting of 3-halophenyl, 4-halophenyl and 3,5-dihalophenyl, R' represents a member of the group consisting of oxygen and methylene, R" represents a member of the group consisting of hydrogen and alkali metal and n represents one of the numbers 0 and 1, in intimate admixture with an edible finely divided solid.

11. A composition claimed in claim 10 wherein the compound is N - (4' - chlorophenyl)-7-oxabicyclo(2.2.1)-heptane-2,3-dicarboximide.

12. A composition claimed in claim 10 wherein the compound is N - (4' - bromophenyl)-7-oxabicyclo(2.2.1)-heptane-2,3-dicarboximide.

13. A composition claimed in claim 10 wherein the compound is N - (3',5' - dichlorophenyl) - 7 - oxabicyclo(2.2.1)-heptane-2,3-dicarboximide.

14. A composition claimed in claim 10 wherein the compound is 3-(4'-chlorophenylcarbamoyl)-7-oxabicyclo(2.2.1)-heptane-2-carboxylic acid.

15. A composition claimed in claim 10 wherein the compound is N-(4'-chlorophenyl)-norbornane-2,3-dicarboximide.

16. A composition claimed in claim 10 wherein the compound is N - (4'-chlorophenylcarbamoyl) - 2-norbornane-carboxylic acid.

17. An animal feed containing from 0.006 to 0.1 percent by weight of a compound having the formula:

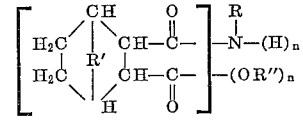

wherein R represents a member of the group consisting of 3-halophenyl, 4-halophenyl and 3,5-dihalophenyl, R' represents a member of the group consisting of oxygen and methylene, R" represents a member of the group consisting of hydrogen and alkali metal and n represents one of the numbers 0 and 1.

18. An animal feed containing from 0.006 to 0.1 percent by weight of N - (4' - chlorophenyl) - 7 - oxabicyclo (2.2.1)-heptane-2,3-dicarboximide.

19. An animal feed containing from 0.006 to 0.1 percent by weight of N-(3',5'-dichlorophenyl)-7-oxabicyclo (2.2.1)-heptane-2,3-dicarboximide.

20. An animal feed containing from 0.006 to 0.1 percent by weight of 3-(4'-chlorophenylcarbamoyl)-7-oxabicyclo(2.2.1)-heptane-2-carboxylic acid.

No references cited.

JULIAN S. LEVITT, *Primary Examiner.*

UNITED STATES PATENT OFFICE
CERTIFICATE OF CORRECTION

Patent No. 3,215,597                             November 2, 1965

Graham T. Stevenson

It is hereby certified that error appears in the above numbered patent requiring correction and that the said Letters Patent should read as corrected below.

Column 1, line 41, after "An" insert -- additional --; same column 1, lines 66 to 75, and column 10, lines 41 to 46, the formula, each occurrence, should appear as shown below instead of as in the patent:

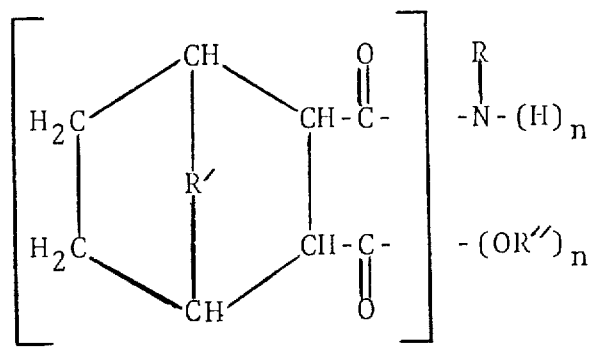

Signed and sealed this 27th day of September 1966.

(SEAL)
Attest:

ERNEST W. SWIDER                            EDWARD J. BRENNER
Attesting Officer                          Commissioner of Patents